(12) United States Patent
Miranda

(10) Patent No.: US 12,291,999 B1
(45) Date of Patent: May 6, 2025

(54) SYSTEM AND RELATED METHOD FOR PRE-HEATING GAS TURBINE ENGINE OPERATING IN STANDBY MODE

(71) Applicant: GE Infrastructure Technology, LLC, Greenville, SC (US)

(72) Inventor: Carlos Miguel Miranda, Lyman, SC (US)

(73) Assignee: GE Infrastructure Technology LLC, Greenville, SC (US)

(*) Notice: Subject to any disclaimer, the term of this patent is extended or adjusted under 35 U.S.C. 154(b) by 0 days.

(21) Appl. No.: 18/499,692

(22) Filed: Nov. 1, 2023

(51) Int. Cl.
*F02C 7/08* (2006.01)
*F02C 7/26* (2006.01)

(52) U.S. Cl.
CPC . *F02C 7/08* (2013.01); *F02C 7/26* (2013.01)

(58) Field of Classification Search
CPC .... F02C 7/08; F02C 7/26; F02C 7/262; F05D 2270/11; F05D 2270/114
See application file for complete search history.

(56) References Cited

U.S. PATENT DOCUMENTS

| 537,307 | A | 4/1895 | Pettes |
| 7,644,573 | B2 | 1/2010 | Smith et al. |
| 8,210,801 | B2 | 7/2012 | Ballard, Jr. et al. |
| 2004/0148129 | A1* | 7/2004 | Gotoh ............... G05B 23/0229 702/183 |
| 2014/0230400 | A1* | 8/2014 | Light .................... F01D 11/24 60/39.5 |
| 2018/0216499 | A1 | 8/2018 | Mathai et al. |

* cited by examiner

*Primary Examiner* — Steven M Sutherland
(74) *Attorney, Agent, or Firm* — James Pemrick; Charlotte Wilson; Hoffman Warnick LLC

(57) ABSTRACT

The disclosure provides a system to heat a portion of a gas turbine (GT) engine of a power generation system in a standby mode. The system includes a first heated fluid manifold and a first conduit coupling a heated fluid supply external to the GT engine to one or more fatigue-prone components within the GT engine. A first plurality of valves is configured to control an amount of heated fluid flow through the first conduit between the heated fluid supply and the one or more fatigue-prone components. A controller is in communication with the first plurality of valves. The controller adjusts an open extent of at least one of the first plurality of valves to control a temperature of the one or more fatigue-prone components. The external heated fluid supply may be an auxiliary system or a second GT engine operating in non-standby mode.

20 Claims, 9 Drawing Sheets

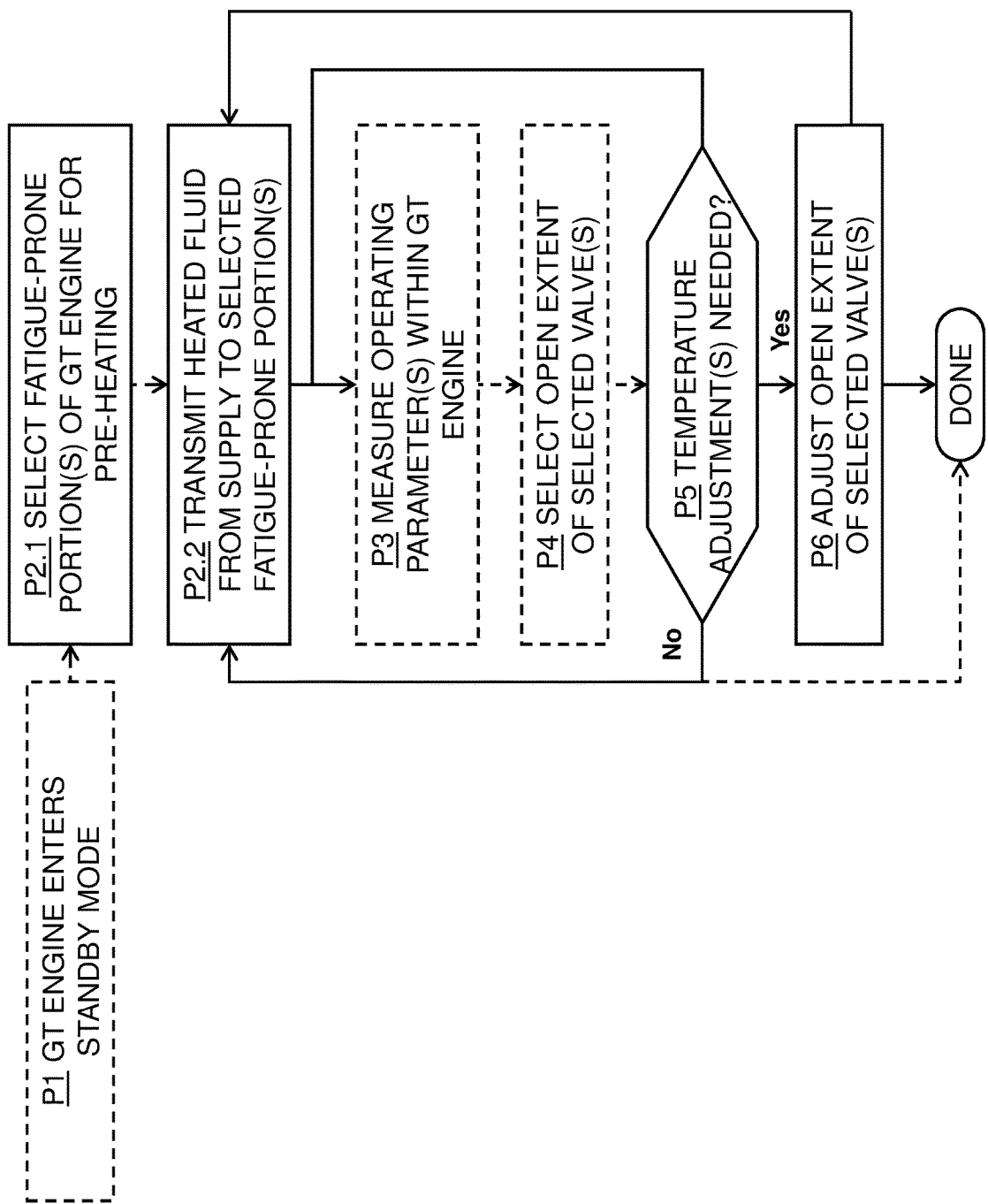

SYSTEM AND RELATED METHOD FOR PRE-HEATING GAS TURBINE ENGINE OPERATING IN STANDBY MODE

TECHNICAL FIELD

The subject matter disclosed herein relates to turbomachines included in power plant systems. More particularly, the subject matter disclosed herein relates to systems and methods for pre-heating components of a gas turbine engine in a standby mode, i.e., in any non-loaded state in which no power is output from the gas turbine engine.

BACKGROUND

In one type of a power-generating plant, a gas turbine engine can be used in conjunction with a generator to generally form a power train. In this type of gas turbine engine, a compressor with rows of rotating blades and stationary vanes compresses air and directs it to a combustor that mixes the compressed air with fuel. In the combustor, the compressed air and fuel are burned to form combustion products (i.e., a hot air-fuel mixture), which are expanded through blades in a turbine (e.g., an expansion turbine). The exhaust gases from the turbine section may be expelled through a stack (as in a simple cycle power plant) or may be directed to a heat recovery steam generator (as in a combined cycle power plant), where the residual heat is used to produce steam to drive a steam turbine.

Often, a power-generating plant includes two or more gas turbine engines, which are operated simultaneously or alternately, depending on power demands from the grid. For instance, during periods of peak demand, each of the two or more gas turbine engines may operate at full-load conditions. However, when demand decreases, one or more of the gas turbine engines may be operated at part-load conditions. If demand becomes even smaller, the operator may put one or more of the gas turbine engines into a standby mode. In the standby mode, the components of the gas turbine engine begin to cool down from their normal operational temperatures with some components cooling faster than others.

When demand returns, it is customary to ramp up the gas turbine engine(s) in standby mode to operational (i.e., power-generating) mode as quickly as possible. Certain gas turbine engine components, when transitioning from standby to non-standby (i.e., any loaded operating state) modes, may experience significant thermal gradients (i.e., large changes in temperature over a relatively short time span). Thermal gradients within the hot gas path (HGP) of the gas turbine system and the cycling of components from standby to non-standby modes can significantly consume component fatigue life, even when compared to sustained operation at high temperatures.

As power grids work to integrate renewable resources (e.g., solar and/or wind energy) for power generation, power plant operators may experience more occasions to cycle the gas turbine engines and to operate the gas turbine engines in different states at a defined frequency to accommodate varying times of demand. A system and method to minimize impacts on the gas turbine components associated with cycling between standby and loaded operating modes would be useful in extending the lifecycle of such gas turbine components and in reducing operating costs associated with plant cycling.

BRIEF DESCRIPTION

All aspects, examples and features mentioned below can be combined in any technically possible way. The reference numerals included in the brief description are provided in accordance with the accompanying Figures and should not be considered as limiting of the one or more embodiments of the present disclosure.

A first aspect of the disclosure provides a system (300) for pre-heating a gas turbine (GT) engine (100) of a power generation system (1000) in a standby mode, in which the system (300) comprises: a first heated fluid manifold (145) coupled to the GT engine (100); a first conduit (141, 156) coupling a heated fluid supply (140, 148) external to the GT engine (100) to the first heated fluid manifold (145); a first plurality of valves (142, VAs, VBs, and/or 150, 152, 154) configured to control an amount of heated fluid flow through the first conduit (141, 156) between the heated fluid supply (140, 148) and one or more fatigue-prone components of the GT engine (100); and a controller (120) in communication with the first plurality of valves, wherein the controller (120) adjusts an open extent of at least one of the first plurality of valves to control a temperature of the one or more fatigue-prone components.

Another aspect of the disclosure includes any of the preceding aspects, and wherein the one or more fatigue-prone components is located within a compressor (102), a combustor (104), or a turbine (110) of the GT engine (100).

Another aspect of the disclosure includes any of the preceding aspects, and further comprising a first sensor (121) coupled to the controller (120), wherein the first sensor (121) is within a compressor (102) or a combustor (104) of the GT engine (100) to measure the temperature of the fatigue-prone component.

Another aspect of the disclosure includes any of the preceding aspects, and further comprising a second sensor (121) coupled to the controller (120), wherein the second sensor (120) is within a wheel space (WS) of the compressor (102) or a turbine (110) of the GT engine (100).

Another aspect of the disclosure includes any of the preceding aspects, and further comprising a second plurality of valves (V1-V5) coupling the heated fluid manifold (145) to the one or more fatigue-prone components within the GT engine (100); wherein the controller (120) selectively adjusts an open extent of each valve of the second plurality of valves (V1-V5) to control a temperature of the one or more fatigue-prone components.

Another aspect of the disclosure includes any of the preceding aspects, and wherein the first plurality of valves includes: an isolation valve (152) configured to impede fluid flow in a selected direction through the first conduit; and a flow control valve (150) coupled to the isolation valve and configured to control the amount of fluid flow through the first conduit in the selected direction; wherein the isolation valve (152) and the flow control valve (150) are positioned within a valve skid (144).

Another aspect of the disclosure includes any of the preceding aspects, and wherein the standby mode comprises a pre-heat operating mode of the GT engine (100).

A second aspect of the present disclosure provides a system (300) for pre-heating a gas turbine (GT) engine (100) of a power generation system (1000), in which the system (300) comprises: a first gas turbine (GT) engine (100, 100A) in a standby mode and having one or more fatigue-prone components; a first heated fluid manifold (145) coupled to the first GT engine (100); a second GT engine (100, 100B) operating in a non-standby mode and having a compressor (102), wherein a portion of the compressor (102) of the second GT engine (100, 100B) provides a heated fluid supply; a second heated fluid manifold (145) coupled to the second GT engine (100); a first conduit (141, 148, 156)

coupling the heated fluid supply to the first heated fluid manifold (145), such that the one or more fatigue-prone components are in thermal connection with a heated fluid from the first heated fluid manifold (145); a first plurality of valves (150, 152, 154) configured to control an amount of a heated fluid flow through the first conduit (141, 148, 156) between the heated fluid supply and the one or more fatigue-prone components; and a controller (120) in communication with the first plurality of valves, wherein the controller (120) adjusts an open extent of at least one of the first plurality of valves to control a temperature of the one or more fatigue-prone components.

Another aspect of the disclosure includes any of the preceding aspects, and wherein the one or more fatigue-prone components are within a compressor (102), a combustor (104), or a turbine (110) of the first GT engine (100, 100A).

Another aspect of the disclosure includes any of the preceding aspects, and further comprising a sensor (121) coupled to the controller (120), wherein the controller (120) determines the open extent of at least one of the first plurality of valves based on a temperature within the first GT engine (100, 100A) monitored via the sensor (121).

Another aspect of the disclosure includes any of the preceding aspects, and wherein the sensor (121) is within a wheel space (WS) of a compressor (102) or a turbine (110) of the first GT engine (100, 100A).

Another aspect of the disclosure includes any of the preceding aspects, and further comprising: a second plurality of valves (V1-V5) coupling the heated fluid supply (145) to the one or more fatigue-prone components of the first GT engine; wherein the controller (120) selectively adjusts an open extent of each valve of the second plurality of valves based on a temperature of the one or more fatigue-prone components to control a temperature of the one or more fatigue-prone components.

Another aspect of the disclosure includes any of the preceding aspects, and wherein the first plurality of valves includes: a first isolation valve (152) configured to impede the heated fluid flow in a selected first direction; and a first flow control valve (150) coupled to the first isolation valve (152) configured to control the amount of heated fluid flow through the first conduit in the selected first direction; wherein the first isolation valve (152) and the first flow control valve (150) are positioned within a valve skid (144) disposed between the first GT engine (100, 100A) and the second GT engine (100, 100B).

Another aspect of the disclosure includes any of the preceding aspects, and wherein the valve skid (144) comprises a second conduit (158) coupled to the second heated fluid manifold (145); a second isolation valve (152) configured to impede the heated fluid flow in a selected second direction opposite from the selected first direction; and a second flow control valve (150) coupled to the second isolation valve (152) configured to control the amount of heated fluid flow through the second conduit (158) in the selected second direction.

A third aspect of the present disclosure provides a method for pre-heating a portion of a gas turbine (GT) engine (100) of a power generation system (1000) in a standby mode, the method comprising: transmitting a heated fluid from a heated fluid supply external to the GT engine through a first conduit to one or more fatigue-prone components within the portion of the GT engine; and adjusting an open extent at least one of a first plurality of valves configured to control a flow of the heated fluid through the first conduit between the heated fluid supply and the one or more fatigue-prone components based on a temperature of the one or more fatigue-prone components.

Another aspect of the disclosure includes any of the preceding aspects, and further comprising: monitoring the temperature of the one or more fatigue-prone components via a sensor within the GT engine; and selecting the open extent of at least one of the first valves based on the monitored temperature of the one or more fatigue-prone components, wherein the adjusting is further based on an operating condition of the GT engine.

Another aspect of the disclosure includes any of the preceding aspects, and wherein the monitored temperature includes a wheel space temperature.

Another aspect of the disclosure includes any of the preceding aspects, and wherein the heated fluid supply is provided by a compressor of an additional GT engine operatively coupled to the GT engine in standby mode, the additional GT engine being in a non-standby mode.

Another aspect of the disclosure includes any of the preceding aspects, and further comprising: transmitting the heated fluid from the heated fluid supply through a first heated fluid manifold to the one or more fatigue-prone components, the first heated fluid manifold comprising a second plurality of valves; and adjusting an open extent of at least one of the second plurality of valves to control a flow of the heated fluid through the first heated fluid manifold based on the temperature of the one or more fatigue-prone components.

Another aspect of the disclosure includes any of the preceding aspects, and wherein the standby mode includes a pre-heat operating mode of the GT engine.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 9 shows a flow diagram of another example methodology of operating a power generation system, according to embodiments of the disclosure.

Figure 1:
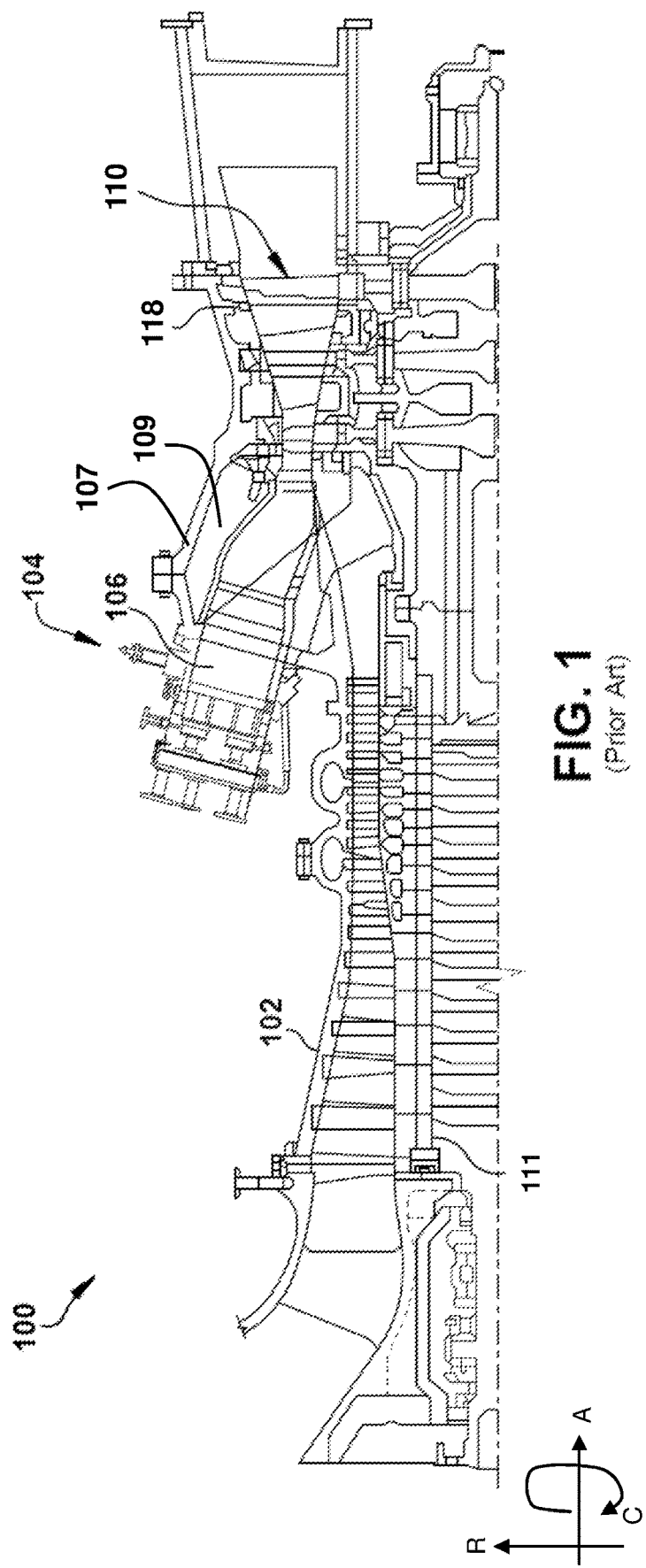
FIG. 1 shows a cross-sectional view of a conventional gas turbine (GT) engine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the gas turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine.

Figure 2:
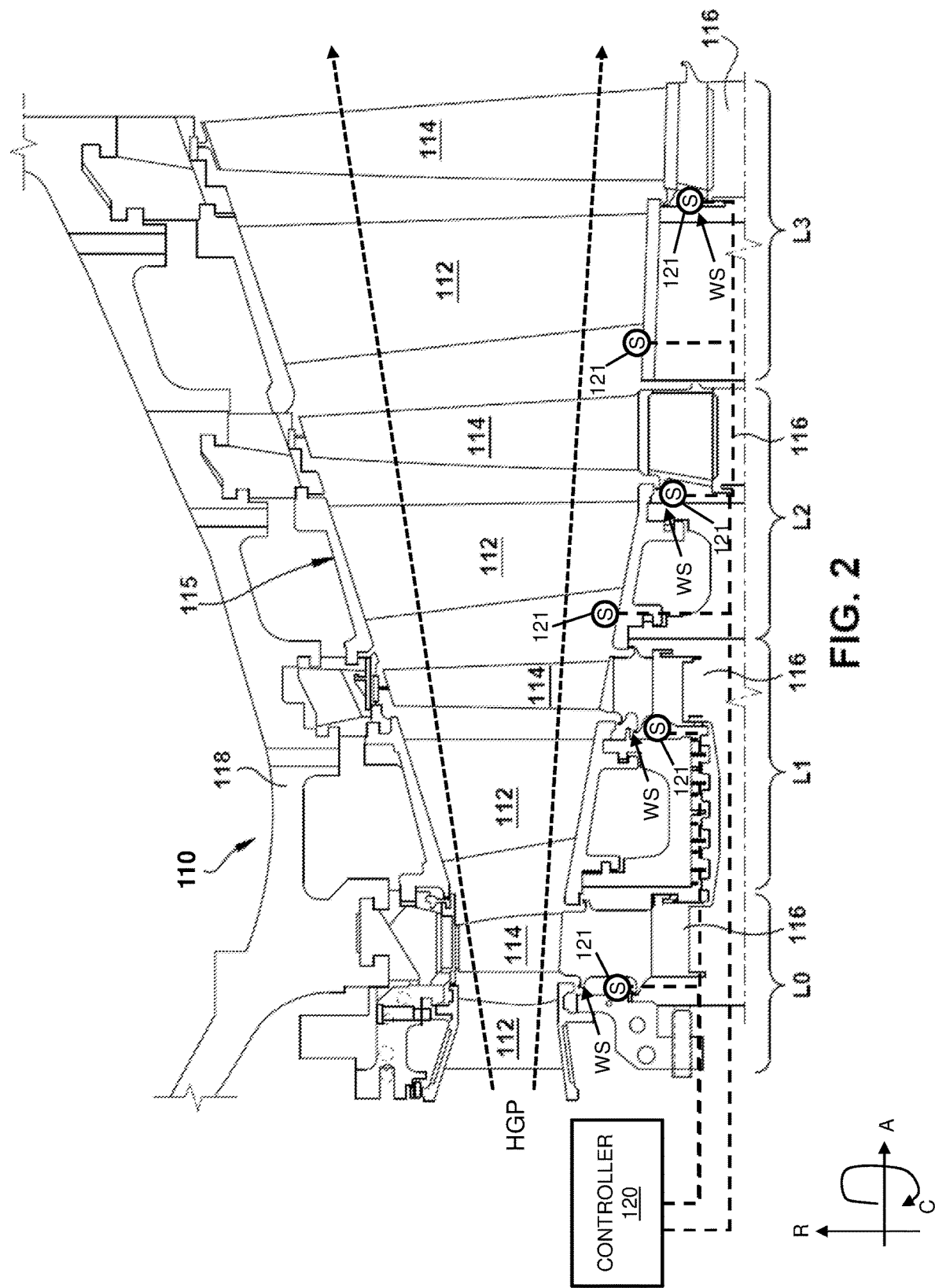
FIG. 2 shows an expanded cross-sectional view of a turbine section of a gas turbine (GT) engine with a controller and sensors, according to embodiments of the disclosure.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine, as shown in the legend of FIGS. 1 and 2.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur and that the description includes instances where the event occurs and instances where it does not.

Where an element or layer is referred to as being "on," "engaged to," "connected to," or "coupled to" another element or layer, it may be directly on, engaged to, connected to, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide a system and a related method for pre-heating components of a gas turbine (GT) engine in a standby mode, i.e., any situation in which the GT engine is not loaded or otherwise producing power. A "standby" mode may include the GT system being non-operational, a pre-heat operation in which the GT system is operating but does not generate power, and/or similar types of operating/non-operating modes. A system of the disclosure provides a heated fluid delivery system that includes one or more valves (e.g., a valve skid) that couple a heated fluid supply external to the GT system in standby mode to the GT system in standby mode, such that a heated fluid may be supplied to fatigue-prone components within the GT system in standby mode.

As used herein, a "fatigue-prone component" may be any component within a compressor, a combustor, or a turbine that is in thermal communication with operative fluid(s) and hence that is subject to potentially drastic and/or detrimental temperature changes based on the cyclic operation of the GT engine. With reference to the Figures, examples of fatigue-prone components in GT engine(s) 100 may include one or more wheels 116 or wheel spaces, rotating blades 114 (or equivalents in the latter stages of compressor 102), stationary blades 112 (or equivalents in the latter stages of compressor 102), combustor (104) liners, working fluid pathway regions, etc., to be pre-heated during a standby mode based on past or current operating temperatures.

The fatigue-prone component, e.g., a blade within the compressor or turbine (or other compressor, combustor, or turbine component(s) discussed herein) may be in thermal communication with the heated fluid delivery system via one or more valves. A main valve is configured to control fluid flow through the first conduit and a heated fluid manifold between the heated fluid supply and the fatigue-prone component. A controller, e.g., one or more computing devices, is in communication with the main valve whereby the controller adjusts a position of the main valve based on a temperature measured by sensor(s) in one or more areas of the GT engine.

During operation, embodiments of the disclosure allow higher temperature fluids from an external supply (e.g., another concurrently operating GT engine or an auxiliary external supply) to be supplied to any fatigue-prone component(s) in the standby GT engine, which have a temperature that is less than a desired (target) temperature. In some cases, the heated fluid may be supplied to an area that is susceptible to slower heating, e.g., the wheel space adjacent to a moving or stationary blade of the GT engine.

Referring to the drawings, FIG. 1 is a cross-sectional view of an illustrative machine including a turbomachine(s) to which teachings of the disclosure can be applied. In FIG. 1, a turbomachine in the form of a combustion turbine or gas turbine (GT) engine 100 (hereinafter, "GT engine 100") is shown. GT engine 100 includes a compressor 102 and one or more combustors 104 disposed with a compressor discharge casing 107, which defines a plenum 109 that receives compressed air from compressor 102. Fuel nozzle(s) within combustor 104 supply fuel and air to a combustion chamber 106 to produce high temperature and high pressure combustion gases. GT engine 100 also includes a turbine assembly 110 (i.e., an expansion turbine or turbine section) and a common compressor/turbine shaft 111 (hereinafter referred to as "rotor 111").

GT engine 100 may be, for example, a 7HA.03 engine, commercially available from General Electric Company, Greenville, S.C. The present disclosure is not limited to any one type of GT engine and may be implemented in connection with other engines including, for example, the other HA, F, B, LM, GT, TM and E-class engine models of General Electric Company and engine models of other companies. More importantly, the teachings of the disclosure are not necessarily applicable to only a turbine assembly in a GT engine and may be applied to practically any type of industrial machine or other turbine, e.g., steam turbines, jet engines, compressors (as in FIG. 1), turbofans, turbochargers, etc. Hence, references to GT engine 100 and, specifically, to turbine assembly 110 of GT engine 100 are merely for descriptive purposes and are not limiting.

FIG. 2 shows a cross-sectional view of an illustrative portion of turbine assembly 110. In the example shown, turbine assembly 110 includes four stages L0-L3 that may be used with GT engine 100 in FIG. 1. The four stages are referred to as L0, L1, L2, and L3. Stage L0 is the first stage and is the smallest (in a radial direction) of the four stages. Stage L1 is the second stage and is disposed adjacent the first stage L0 in an axial direction. Stage L2 is the third stage and is disposed adjacent the second stage L1 in an axial direction. Stage L3 is the fourth, last stage and is the largest (in a radial direction). It is to be understood that four stages are shown as one example only, and each turbine may have more or less than four stages. Stages L0-L3 together may define a hot gas path (HGP) through turbine assembly 110, portions of which are indicated via dashed lines.

A plurality of stationary turbine vanes or nozzles 112 (hereafter "nozzle 112" or "nozzles 112") may cooperate with a plurality of rotating turbine blades 114 (hereafter "blade 114" or "blades 114") to form each stage L0-L3 of turbine assembly 110 and to define a portion of a working fluid path (i.e., the hot gas path) through turbine assembly 110. Each stage 115 includes a plurality of nozzles 112 and a plurality of blades 114. Blades 114 in each stage 115 are coupled to rotor 111 (FIG. 1), e.g., by a respective rotor wheel 116 that couples them circumferentially to rotor 111 (FIG. 1). That is, blades 114 are mechanically coupled in a circumferentially spaced manner to rotor 111, e.g., by rotor wheels 116. Turbine assembly 110 includes a plurality of nozzles 112 mounted to a casing 118 and circumferentially spaced around rotor 111 (FIG. 1). It is recognized that blades 114 rotate with rotor 111 (FIG. 1) and thus experience centrifugal force, while nozzles 112 are static. Compressor 102 may feature a similar arrangement of blades and nozzles, but the path of working fluid through compressor 102 may progress from a larger cross-sectional area to a smaller cross-sectional area (i.e., it may be the opposite of turbine assembly 110).

With reference to FIGS. 1 and 2, in operation, air flows through compressor 102 and increases in pressure and temperature, and the pressurized, heated air is supplied to combustor 104 via the compressor discharge casing 109. Specifically, the pressurized air is supplied to a head end section that is integral to combustor 104 and that includes one or more fuel nozzles. The fuel nozzle(s) are in flow communication with combustion region 106. The fuel nozzle(s) are also in flow communication with a fuel source (not shown in FIG. 1) and channel fuel and air to combustion region 106. Combustor 104 ignites and combusts fuel in the combustion region 106 to produce high-temperature combustion gases. Combustor 104 is in flow communication with turbine assembly 110, within which thermal energy from the combustion gas stream is converted to mechanical rotational energy by directing the combusted fuel (e.g., working fluid) into the working fluid path to turn blades 114. Turbine assembly 110 is rotatably coupled to and drives rotor 111. Compressor 102 may also be rotatably coupled to rotor 111. At least one end of rotor 111 may extend axially away from compressor 102 or turbine assembly 110 and may be attached to a load or machinery, such as, but not limited to, a generator (130, shown in FIG. 3), a load compressor, and/or another turbine.

GT engine 100 may include a controller 120 (e.g., one or more computing devices) coupled to one or more sensors 121 (also labeled "S"), one or more of which are disposed within a respective portion of GT engine 100, e.g., within turbine assembly 110. Sensor(s) 121 may be any form for monitoring of various GT engine parameters, such as mechanical, electrical, and/or chemical parameters. In an example, sensor(s) 121 may be in the form of temperature sensor(s), gas sensor(s), flow sensor(s), pressure sensor(s), and/or other devices for evaluating the properties of GT engine 100 (e.g., those pertaining to turbine assembly 110 or other components such as compressor 102, combustor 104, etc.) and/or materials therein at a particular location. Sensor(s) 121 each may include any instrumentation for measuring other properties of working fluid(s) in GT assembly 100.

In an example, sensor(s) 121 may include temperature sensors, but sensor(s) 121 alternatively may include pressure sensors, flow rate sensors, etc. Various types of temperature sensors 121 for measuring temperature in GT engine 100 may include thermocouples, resistive thermometers, thermally controlled resistors ("thermistors"), etc. Other types of sensors 121 may measure properties such as pressure, flow rate, fluid composition, etc., within GT engine 100 in addition to (or place of) temperature sensors. Sensor(s) 121 may be wirelessly and/or physically connected to controller 120 such that controller 120 may receive various readings collected from sensor(s) 121 as data. Controller may interpret and use data from sensor(s) 121 to control a flow of heated fluid(s) into selected parts of GT engine 100 in preparation for transitioning from standby mode to a non-standby (loaded operation) mode, as discussed herein.

Figure 3:
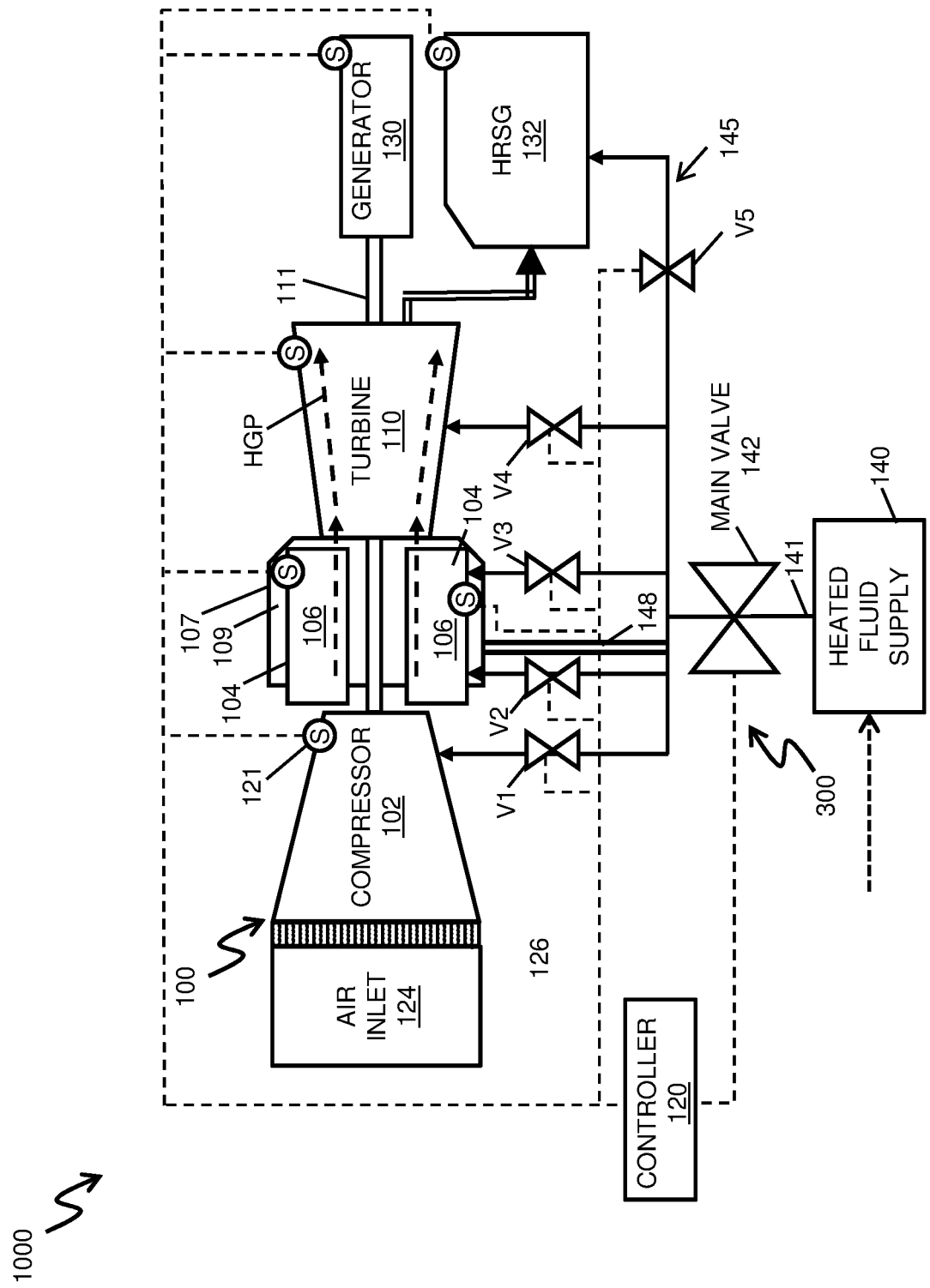
FIG. 3 shows a schematic view of a power generation system including a GT engine and a heated fluid delivery system for transmitting a heated fluid from an external heat source, according to embodiments of the disclosure.

FIG. 3 shows a schematic depiction of a power generation system 1000, which includes a GT engine 100 and which is configured for implementing various embodiments of the disclosure. Power generation system 1000 may defined as having one set of power generation components (i.e., one GT engine 100 having compressor 102, combustor 104, turbine assembly 110), but other types of power sources and/or assemblies may also be used in embodiments of the disclosure. Although power generation system 1000 in various further implementations may include two, five, or more gas turbine engines 100 in one power plant, only one GT engine 100 is shown in detail in FIG. 3 solely for the sake of example.

As discussed, GT engine 100 may include compressor 102, which compresses an incoming flow of fluid (e.g., air) from an air inlet 124 as it flows through compressor 102. Compressor 102 may include a plurality of stages of stator vanes (shown in FIG. 1) and rotating blades (FIG. 1) positioned within compressor 102. The stator vanes and rotating blades positioned within compressor 102 may be configured to aid in moving and/or passing of fluid through compressor 102. Compressor 102 may include a set of inlet guide vanes (IGVs) 126. IGVs 126 are a type of adjustable compressor nozzle that is structured specifically to direct the incoming flow of operating fluid onto the rotating blades of compressor 102. IGVs 126 may be adjustable between several positions to affect the flow rate, incident angle, and/or other properties of fluid entering compressor 102. IGVs 126 thus may be capable of affecting the temperature of compressor 102, the power output from GT engine 100, and/or other properties.

Compressor 102 delivers a flow of compressed fluid (e.g., compressed air) to one or more combustors 104 (e.g., a single annular combustor or a plurality of combustion cans, as shown) via compressor discharge casing 107 (FIG. 1). Combustor 104 mixes the flow of compressed fluid with a pressurized flow of fuel provided by fuel nozzle(s) and ignites the mixture within the combustion chamber 106 to create a flow of combustion gas. The flow of combustion gas is in turn delivered to turbine assembly 110, which as discussed typically includes a plurality of stages of stationary nozzles (also known as "vanes") 112 (FIG. 2) and turbine blades 114 (FIG. 2). The flow of combustion gas through HGP (FIG. 2) of turbine assembly 110 causes rotor 111 to rotate and produce mechanical work. The mechanical work produced in turbine assembly 110 drives compressor 102 via rotor 111 and may be used to drive a generator 130 (e.g., an external component) configured to generate power. Generator 130 may be electrically coupled to electrical infrastructure for delivering power to customers, e.g., various transmission lines (not shown) via electrical substations, distribution lines, etc.

Turbine assembly 110 also may be fluidly coupled to a heat recovery steam generator (HRSG) 132 defining a passage for hot gases to flow therethrough. The passage may include various water-transmitting conduits in thermal (but not physical) communication with the hot gases, allowing the hot gas to convert water within the conduits into steam as generally known in the art. Steam from the HRSG 132 may be supplied to a steam turbine (not shown) as part of a combined cycle power generation system.

During intervals in which GT engine 100 is in a standby mode (e.g., not operating at all or operating in an unloaded pre-heat mode), certain components, such as nozzles 112 (FIG. 2) and turbine blades 114 (FIG. 2), may undergo significant temperature changes over a relatively short time span as GT engine 100 is ramped up from a standby mode to a non-standby mode. In some instances, these components heat faster than surrounding components (e.g., bulkier turbine casings or rotor wheels). When transitioning from standby mode to an operating mode, it is customary to rapidly increase air flow through the GT engine 100. However, such rapid heating can lead to high thermal gradients and eventually to cycle fatigue in the affected components. Embodiments of the disclosure mitigate or prevent mechanical wear or fatigue on nozzles 112 and/or blades 114 as may occur when transitioning rapidly from standby mode to an operating mode in which GT engine 100 is loaded (i.e., it produces power via generator 130) by pre-heating such fatigue-prone components in a controlled manner. It should be understood that components other than nozzles 112 and blades 114 may be prone to fatigue and may benefit from the present pre-heating system 300.

Figure 4B:
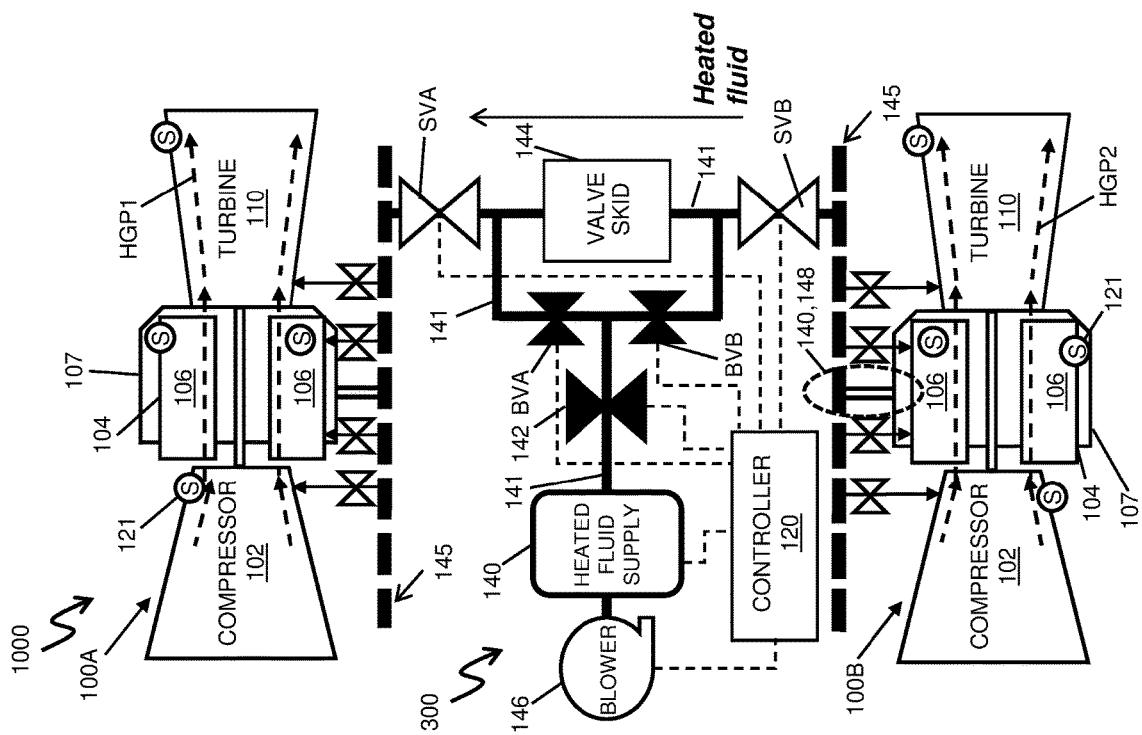
FIG. 4B shows a schematic view of a power generation system including two GT engines fluidly coupled through a heated fluid delivery system, in which a heated fluid is transmitted from a first (loaded) GT engine to a second (standby) GT engine, according to embodiments of the disclosure.
Figure 5:
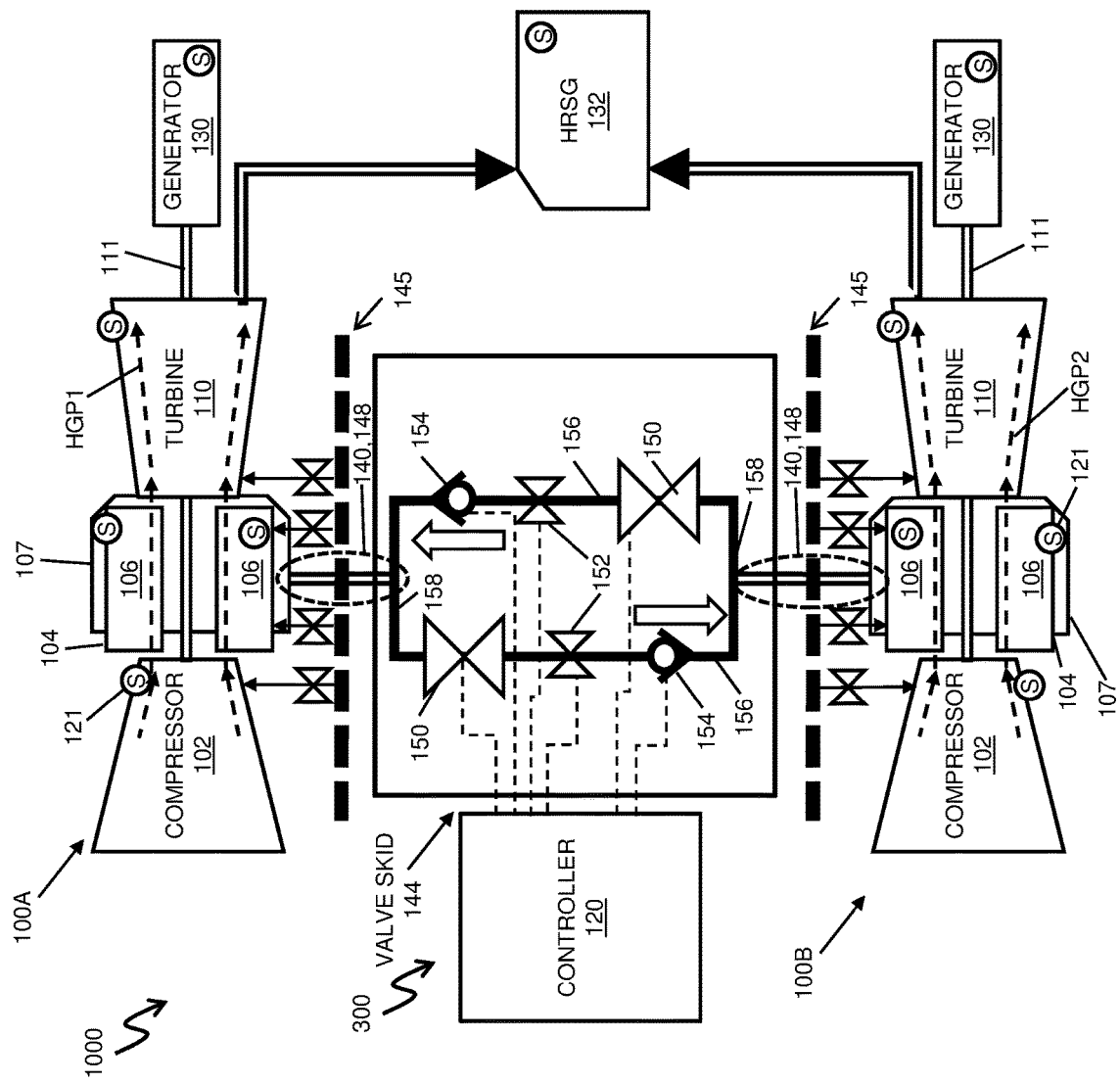
FIG. 5 shows an expanded schematic view of the valve skid fluidly coupling two GT engines in the power generation system of FIGS. 4A and 4B, according to embodiments of the disclosure.
Figure 6:
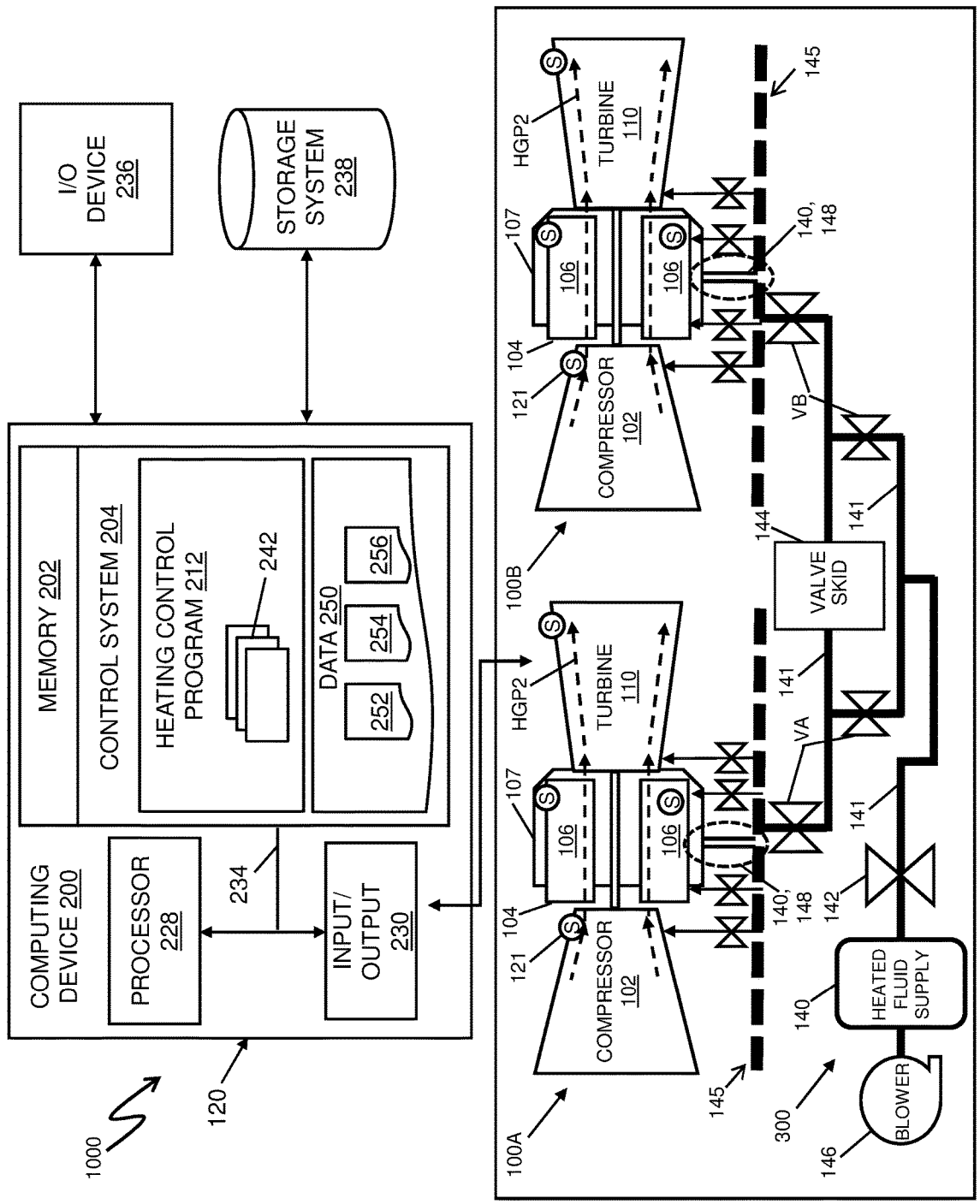
FIG. 6 shows a block diagram of a controller coupled to sensors and valves in the power generation system of FIGS. 4A, 4B, and 5, according to embodiments of the disclosure.

The heated fluid may originate from any external supply 140, and the term "external" is intended to describe any source of heated fluid(s) that is separate from the GT engine 100 in standby mode whose components are to be pre-heated. As discussed elsewhere herein, the external supply (ies) 140 may provide the heated fluid to the GT system 100 in standby mode from an auxiliary system, a component, a reservoir, etc., where a temperature of the heated fluid is independent of the temperature of any part of GT system 100 in standby mode. In one exemplary configuration, the external heat source 140 may be another gas turbine engine 100 in the power generation system 1000 (as shown in FIGS. 4B, 5, and 6), which is currently operating at steady state or otherwise at a higher temperature than the GT engine 100 whose components are in need of pre-heating, i.e., the "fatigue-prone components" of the GT engine 100 in standby mode.

Compressor 102, combustor 104, turbine assembly 110, HRSG 132, and/or other heated components of GT engine 100 may be fluidly coupled to a heated fluid supply 140 via a conduit 141 and a heated fluid manifold 145. The heated fluid supply 140 provides a heated fluid (e.g., any air, combusted gases, etc.) having a temperature sufficient to warm (pre-heat) the fatigue-prone components of GT engine 100 as GT engine 100 transitions from standby mode to an operating mode. The heated fluid may be fluidly transmitted to one or more components within GT engine 100 to increase their temperature and reduce severe thermal gradients that the one or more components would otherwise experience from rapid loading of GT engine 100. In an example, heated fluid supply 140 may be part of a pre-heating system 300 that includes conduit 141 and a main valve 142 and/or a valve skid 144 disposed along conduit 141 for fluidly coupling fluid passage(s) within combustor 104, turbine assembly 110, HRSG 132, etc., with an external fluid supply 140 or another gas turbine engine 100. The other gas turbine assembly, moreover, may be mounted on the same rotor 111 or a different rotor (as shown in FIGS. 4A, 4B, 5, and 6).

A set of valves (separately labeled V1, V2, V3, V4, V5) each may govern a flow of heated fluid(s) from heated fluid supply 140 to various heated components within GT engine 100 or power generation system 1000. A main valve 142 controls the flow of the heated fluid to the heated fluid manifold 145 to which the set of valves V1-V5 are fluidly coupled. The heated fluid(s) within fluid supply 140 may be supplied from still other systems, locations, etc., as indicated by the dashed line entering heated fluid supply 140. In addition, an extraction conduit 148 may extend from the compressor discharge casing 107 to the heated fluid manifold 145 for extracting a portion of the compressed air, as will be discussed further herein.

Although five valves are shown in FIG. 3 as an example, any desired number of valves may be included. Any one or more of valves V1, V2, V3, V4, V5 may have an open extent thereof adjustable between completely open, completely closed, and a number of partially open/closed positions to control how much heated fluid (and hence, how much pre-heating) will be provided to a corresponding section or component of GT engine 100. Valve(s) V1, V2, V3, V4, V5 may be coupled to controller 120 (e.g., via electro-mechanical converter(s) (not shown)) such that controller 120 is operable to adjust valve(s) V1, V2, V3, V4, V5 to control the amount of heated fluid(s) transmitted from heated fluid supply 140 to the HGP and other fatigue-prone areas of GT engine 100.

Although FIG. 3 depicts an example where one controller 120 and heated fluid supply 140 are connected to the heat fluid manifold 145 supplying each valve V1, V2, V3, V4, V5, further implementations may feature additional controller(s) 120 and/or heated fluid supply (ies) 140, in which case certain valve(s) V1, V2, V3, V4, V5 may be coupled to different controller(s) 120 and/or heated fluid supply (ies) 140 via separate manifolds (not shown). During operation, controller(s) 120 can determine whether to open, close, or otherwise adjust the position of the main valve 142, valves VA, VB (shown in FIGS. 4A, 4B), and valve(s) V1, V2, V3, V4, V5 to direct heated fluid(s) from heated fluid supply (ies) 140 to various fatigue-prone portions the HGP, e.g., certain locations within GT engine 100. Controller 120 can generally base its determination on whether one or more fatigue-prone regions within GT engine 100 are operating at less than a desired temperature during a standby mode of GT engine 100.

Figure 4A:
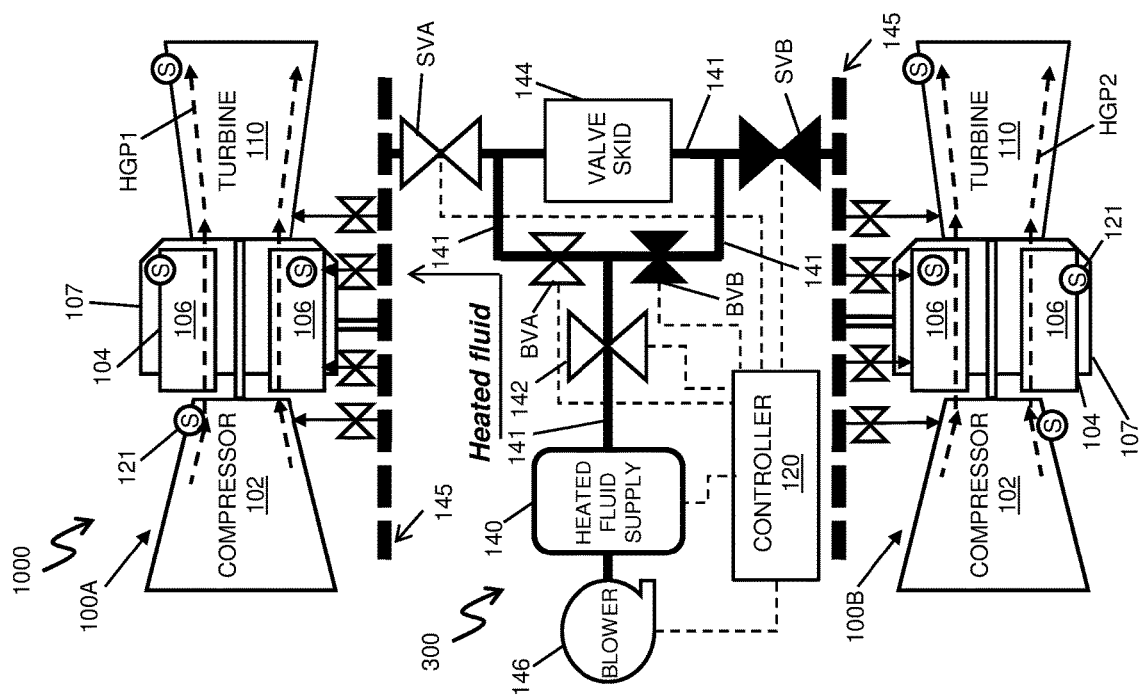
FIG. 4A shows a schematic view of a power generation system including two GT engines fluidly coupled through a heated fluid delivery system, in which a heated fluid is transmitted from an external heat source to a GT engine in standby mode, according to embodiments of the disclosure.

FIGS. 4A and 4B each depict a power generation system 1000 with two GT engines 100 (separately labeled 100A, 100B) that are interconnected through the pre-heating system 300. The pre-heating system 300, which includes heated fluid supply 140 and/or valve skid 144, is operatively coupled to controller(s) 120. Each GT engine 100, particularly those having fatigue-prone components and/or areas where high temperature fluid passes, may be fluidly coupled to the pre-heating system 300 through its respective heated fluid manifold 145, one or more conduits 141, and a series of valves disposed along conduit(s) 141. Valves coupled to GT engine 100A are identified as bypass valve "BVA" and secondary valve "SVA" (with "A" suffix representing delivery to GT engine 100A), and valves coupled to GT engine 100B are identified as bypass valve "BVB" and secondary valve "SVB" (with "B" suffix representing delivery to GT engine 100B). Although two icons are shown in FIGS. 4A and 4B to indicate each of bypass and secondary valves BVA, BVB, SVA, SVB, it is understood that any number of valves may couple heated fluid supply 140 to GT system(s) 100A, 100B.

Bypass valves BVA, BVB and secondary valves SVA, SVB are positioned between heated fluid supply 140 and a respective heated fluid manifold 145 of GT engine 100A, 100B (such manifolds 145 being represented in FIGS. 4A, 4B, 5, and 6 by a heavy dashed line). For the sake of simplicity, FIGS. 4A, 4B, 5, and 6 omit respective valves V5 disposed between the fluid manifold(s) 145 and the HRSG 132. The function of valves V1-V5 to provide heated fluid to various areas of a GT engine 100 (and, optionally, HRSG) is discussed above with respect to FIG. 3. Each GT system 100A, 100B moreover may have a respective HGP (separately labeled HGP1, HGP2).

In some implementations, one GT engine 100A, 100B may be operating in a non-standby operating mode (e.g., loaded and producing power via generator 130), while another GT engine 100A, 100B may be in standby mode (i.e., not producing power via generator 130). In the exemplary schematics of FIGS. 4A and 4B, GT engine 100A is in standby mode, while GT engine 100B is in a non-standby (power-generating) operating mode.

In FIG. 4A, a blower 146 upstream of the heated fluid supply 140 circulates the heated fluid at sufficient pressure to flow through the main valve 142 and through open valves BVA, SVA to the heated fluid manifold 145 coupled to GT engine 100A. Meanwhile, valves BVB, SVB are closed to prevent the heated fluid from being directed to GT engine 100B, which is operational in a non-standby operating mode. Because the heated fluid is being provided by the heated fluid supply 140 from an external source, the valve skid 144 (if present) can be bypassed by the controlled opening of valves BVA, SVA and the controlled closing of valves BVB, SVB. As shown and previously discussed, the valves 142, BVA, SVA, BVB, SVB, etc. are in communication with the controller 120, as is the blower 146.

In this case, the GT engine 100A operating in a standby operating mode may receive heated fluid(s) from heated fluid supply 140 through its respective valve(s) BVA, SVA and V1, V2, V3, V4, V5 (V5 shown in FIG. 3) or through a valve skid 144 (FIGS. 4A, 4B). The other GT engine 100B may operate in a non-standby mode to generate electrical power (e.g., GT engine 100A may be in in a standby mode when GT engine 100B is subjected to a load). It should be understood that either GT engine 100A, 100B may be in non-standby mode while the other GT engine 100A, 100B is in standby mode, and the controller 120 may alternate the standby mode periods between GT engines 100A, 100B to equilibrate thermal stresses experienced by components of each GT engine 100A, 100B.

Heated fluid delivery system 300, including heated fluid supply 140 (or valve skid 144), bypass valve(s) BVA, BVB, and secondary valves SVA, SVB may be operable to transmit heated fluids to, or heated fluids from, any GT engine 100A, 100B having a heated fluid manifold 145 that is fluidly connected to heated fluid supply 140. That is, valve(s) BVA, SVA, BVB, SVB (as shown in FIG. 4A) or valve skid 144 (as shown in FIG. 4B) may allow fluids to flow in either direction depending on which of the GT engine(s) 100A, 100B is/are require temperature control via heated fluid(s).

As shown in FIG. 4B, the flow of fluid(s) from operating GT engine 100B to GT engine 100A in standby mode via heated fluid supply (ies) 140 may be manipulated via controller 120. In an example, GT engine 100A may be in a standby mode, and GT engine 100B may be in a non-standby operating mode. In this case, a portion of GT engine 100B may define all or a portion of heated fluid supply 140. For instance, the heated fluid to be supplied may be compressed air that is extracted, via extraction conduit 148, from the compressor discharge casing 107 that surrounds the combustors 104. In this case, extraction conduit 148 may be fluidly coupled to another portion of heated fluid supply 140 (e.g., a fluid reservoir) or valve skid 144 (where applicable), enabling the hot compressed air to be transmitted to GT system 100A. The air extracted from compressor discharge casing 107 may be conveyed via a conduit 148, which is coupled to heated fluid manifold 145 of GT engine 100B (as shown in FIG. 4B) or directly to a conduit 156 or 158 of valve skid 144 (as shown in FIG. 5).

In the exemplary embodiment of FIG. 4B, main valve 142 coupled to external heated fluid supply 140 is closed, bypass valves BVA and BVB are closed, and secondary valves SVA and SVB are open. Heated fluid flows from GT engine 100B through secondary valve SVB, valve skid 144 (shown in more detail in FIG. 5), and valve SVA to pre-heat fatigue-prone components in GT engine 100A. In some embodiments, blower 146, heated fluid supply 140, and main valve 142 may be omitted, and the GT engines 100A, 100B may be fluidly coupled via valve skid 144 and respective fluid manifolds 145. In the configurations depicted in FIGS. 4A and 4B, it should be understood that one GT engine 100 may be in standby mode, while the other GT engine 100 is in non-standby (power-generating) mode, and the heated fluid delivery system 300 is configured to provide heated fluid to or from any GT engine 100, via an external heated fluid supply 140 or the non-standby GT engine 100.

FIG. 5 depicts an expanded view of valve skid 144 for transmitting heated fluid(s) through heated fluid delivery system 300. In particular, FIG. 5 depicts an example set of components to enable flow of heated fluid(s) between GT systems 100A, 100B in either direction, as generally discussed elsewhere herein. Heated fluid delivery system 300 (specifically, valve skid 144) may include different pathways to enable flow of heated fluid(s) in several directions. Two pathways (represented by block arrows) are shown in valve skid 144 as an example, but any number of pathways may be provided to accommodate the number of GT system(s) 100 coupled thereto. Pathways may be defined by conduits 156 to which valves 150, 152, 154 are coupled, and conduits 156 may be coupled to one another by conduits 158, although other arrangements of conduits may be employed, as needs dictate. In an embodiment, valve skid 144 may include one or more isolation valves 150 to enable flow of heated fluid(s) in only one direction. Isolation valve(s) 150 may impede (or altogether prevent) fluid(s) from traveling in other than their intended direction, e.g., they may prevent fluids from the HGP of GT engine 100A in a standby mode from being transmitted to GT engine 100B that is in a steady state (i.e., hotter) operating mode. Isolation valve(s) 150 may be implemented together with other fluid control features to define an intended direction of fluid flow along a particular pathway.

A flow control valve 152 may be fluidly coupled to isolation valve(s) 150 in each pathway and may be configurable between a variety of partially open (or closed) positions to define the fluid flow within each pathway. Control signals issued from controller 120 may be operable to adjust flow control valve(s) 152 to a desired operative position (i.e., open extent), and hence to increase or decrease the amount of heating provided via heated fluid(s) within heated fluid delivery system 300.

Valve skid 144 also may include an additional isolation valve 154 (shown in FIG. 5 as a "check valve") to further impede or prevent heated fluid(s) from flowing against the intended direction of each pathway. Additional isolation valve(s) 154 may include any currently known or later developed structure for allowing fluid to flow in only one direction and furthermore may be structured to have a "cracking pressure" defining a minimum difference in upstream and downstream pressures for allowing additional isolation valve(s) 154 to open. Where desired or applicable, additional isolation valve(s) 154 may prevent heated fluid delivery system 300 from transmitting any heated fluid(s) to GT system(s) 100 until at least a minimum amount of heated fluid is available for transmission.

Referring to FIG. 6, a schematic depiction of controller 120 and sub-components thereof is illustrated as part of power generation system 1000. In the FIG. 6 illustration, the operative couplings between controller 120 and various components of GT engines 100 are shown only schematically for clarity of illustration. As shown, controller 120 may include a computing device 200, which may include a memory 202 with a control system 204 operating thereon. Control system 204 may include, e.g., a heating control program 212. Heating control program 212 may cause controller 120 to act on and/or modify components of GT engine(s) 100 and/or may modify an existing operational methodology of controller 120 for operating GT engine(s) 100. Controller 120 as shown in FIG. 6 represents one type of hardware for interacting with and/or controlling GT engine 100.

As discussed herein, controller 120 may interpret operational data from sensor(s) 121 (e.g., temperature data for fatigue-prone components and/or other portions of GT engine 100) and, in response to such data, cause heated fluid(s) to be transmitted from heated fluid delivery system 300 into a desired part of GT engine 100, which is in standby mode or in a transition period between standby mode and a power-generating operating mode (e.g., up to steady state). Within controller 120, heating control program 212 may monitor and/or interact with, and in some cases override, other operations that controller 120 undertakes to control GT engine 100 and heated fluid delivery system 300 (e.g., adjusting of valves therein to direct heated fluids into GT engine 100) when GT engine 100 is in standby mode. Control system 204 and heating control program 212 may be part of a primary control system for GT engine 100 or may be separate and interact with a primary control system for GT engine 100.

According to an example, controller 120 can monitor GT engine 100 via sensor(s) 121 when in standby mode and may periodically or continuously evaluate whether to transmit heated fluid(s) from heated fluid supply (ies) 140 to the fluidly coupled one or more fatigue-prone portions of GT engine 100 (e.g., one or more components within compressor 102, combustor 104, turbine assembly 110, or HRSG 132). Heating control program 212 may cause controller 120 to operate GT engine 100 without any heated fluid(s) being delivered, e.g., each of main valve 142, VA valves, VB valves, and valves V1, V2, V3, V4, V5 may be in a completely closed position. Heating control program 212 may allow selective transmission of heated fluid(s) to a fatigue-prone portion of the HGP of GT engine 100 to decrease the thermal stresses experienced by the fatigue-prone components during the transition between standby and non-standby modes.

Embodiments of the present disclosure may be configured or operated in part by a technician, computing device 200, and/or a combination of a technician and computing device 200. It is understood that some of the various components shown in FIG. 6 can be implemented independently, combined, and/or stored in memory for one or more separate computing devices that are included in computing device 200. Further, it is understood that some of the components and/or functionality may not be implemented, or additional schemas and/or functionality may be included as part of control system 204.

Computing device 200 can include a processor unit (PU) 228, an input/output (I/O) interface 230, and a bus 234. Further, computing device 200 is shown in communication with an external I/O device 236 and a storage system 238. Control system 204 may provide heating control program 212, which in turn can operate using various modules 242 (e.g., a calculator, a determinator, a comparator, etc.) for implementing various functions and/or logical steps. The various modules 242 can use algorithm-based calculations, look-up tables, and similar tools stored in memory 202 for processing, analyzing, and operating on data to perform their respective functions. In general, PU 228 can execute computer program code to run software, such as control system 204, which can be stored in memory 202 and/or storage system 238. While executing computer program code, PU 228 can read and/or write data to or from memory 202, storage system 238, and/or external I/O device 236. Bus 234 can provide a communications link between each of the components in computing device 200. I/O device 230 can comprise any device that enables a user to interact with computing device 200 or any device that enables computing device 200 to communicate with the equipment described herein and/or other computing devices. I/O devices 230, 236 (including but not limited to keyboards, displays, pointing devices, etc.) can be coupled to controller 120 either directly or through intervening I/O controllers (not shown).

Memory 202 can also include various forms of data 250 pertaining to various components of GT engine 100, e.g., various forms of data and/or predetermined data which controller 120 may use as a reference to control the preheating of any components within GT engine 100 in standby mode. Heating control program 212 can store and interact with data 250 subdivided into various fields. For example, operating parameter field 252 can store any and all types of data collected by sensor(s) 121 (e.g., temperature, pressure, flow rate, power output, operating efficiency, other parameters affecting component(s) within the HGP, etc.), which may characterize the status of GT engine 100 as it operates. Where applicable, operating parameter field 252 may include information for classifying the operating status of GT engine 100 (e.g., intended power output for loaded or standby modes, target component temperatures in these modes, etc.). Data 250 may additionally or alternatively include a valve position field 254 for relating the position of one or more valves 142, BVA, SVA, BVB, SVB, V1, V2, V3, V4, V5, valve skid 144, etc., to the amount of heat transfer into GT engine 100 from heated fluid(s) when certain valves are in certain positions.

Data 250 may include one or more threshold values for various parameters measured with sensor(s) 121 during operation of GT engine 100 during a standby mode. The thresholds may indicate whether any components within GT engine 100 need to be pre-heated using heated fluid(s) from heated fluid supply (ies) 140 prior to increasing load on the GT engine 100 and/or an amount of heated fluid(s) required to reach a target temperature for a given component. According to an example, the threshold(s) may include a threshold temperature for one or more heated components of GT engine 100 (e.g., within compressor 102, combustor 104, turbine assembly 110, and/or HRSG 132). One or more thresholds may be stored in a threshold field 256 of data 250.

Computing device 200 can comprise any general-purpose computing article of manufacture for executing computer program code installed by a user (e.g., a personal computer, server, handheld device, etc.). However, it is understood that computing device 200 is only representative of various possible equivalent computing devices and/or technicians that may perform the various process steps of the disclosure. In addition, computing device 200 can be part of a larger system architecture operable to model and/or control various aspects and elements of GT engine 100 and, more generally, power generation system 1000.

To this extent, in other embodiments, computing device 200 can comprise any specific-purpose computing article of manufacture comprising hardware and/or computer program code for performing specific functions, any computing article of manufacture that comprises a combination of specific-purpose and general-purpose hardware/software, or the like. In each case, the program code and hardware can be created using standard programming and engineering techniques, respectively. In one embodiment, computing device 200 may include a program product stored on a computer readable storage device, which can be operative to automatically control other elements of GT engine 100 when executed. Computing device 200 may also take the form of, e.g., a remote monitoring system that is part of a central monitoring system, which in turn is responsible for controlling flow of heated fluid(s) to or from multiple GT engines 100. In this case, computing device 200 may represent a portion or subcomponent of a central control system.

Figure 7:
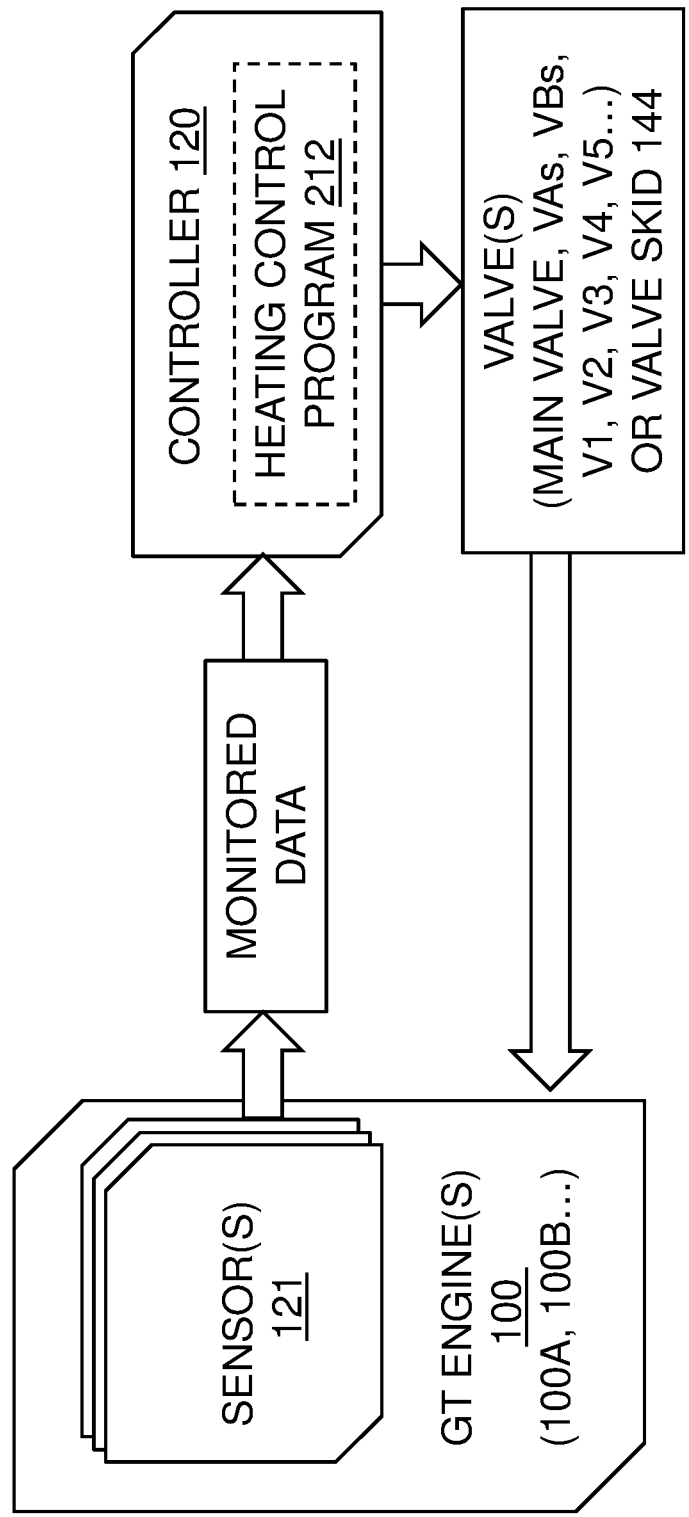
FIG. 7 shows a schematic view of components of the controller of FIG. 6, according to embodiments of the disclosure.

Referring to FIGS. 6 and 7 together, interactions between GT engine(s) 100 and controller 120 are discussed in further detail. As noted herein, GT engine 100 may be communicatively coupled to controller 120, such that various elements within GT engine 100 (e.g., sensor(s) 121) provide data to controller 120. Controller 120 may operate on and/or interpret the provided data to affect the operation of GT engine 100. Controller 120 may implement one or more operational methodologies to interact with and/or control GT engine 100 through heating fluid delivery system 300, via valve(s) 142, VAs, VBs, V1, V2, V3, V4, V5, valve skid 144, and/or heated fluid supply 140.

Embodiments of the disclosure may provide an independent process for control of GT engine 100 by controller 120. In some implementations, controller 120 may interact with and/or override an existing methodology for controlling GT engine 100 when it is in a standby mode. Such existing methodologies may operate on the same data as embodiments of the disclosure, or other data received from GT engine 100 and/or other sources. As depicted in the FIG. 7 example, controller 120 may receive monitored data of GT engine 100 (e.g., various component temperatures within the HGP, etc.) via one or more sensor(s) 121. Controller 120 may additionally or alternatively receive various forms of data indicating the operating state of GT engine 100, e.g., such as whether the GT engine 100 is in a standby mode (e.g., GT engine 100 is not operating, a pre-heat operation is underway, etc.).

As discussed herein, a heating control program 212 may use the various types of data and/or signal sensor(s) 121 to determine whether to transmit heated fluid(s) to a particular turbine assembly 110 (e.g., components of GT engine(s) 100 operating in a standby mode to a non-standby mode). As shown, controller 120 may receive monitored data (e.g., temperatures) from each sensor within GT engine(s) 100. Controller 120 may compare the temperature data and/or other operational parameters with various thresholds within data 250 (e.g., stored within threshold field 256). Heating control program 212, in response to determining that any monitored temperatures are less than a desired temperature for non-standby modes, may adjust one or more of valve(s) 142, VAs, VBs, V1, V2, V3, V4, V5 and/or valves of valve skid 144 to transmit heated fluid(s) from heated fluid supply (ies) 140 to portion(s) of GT system(s) 100 in need of pre-heating. The amount of heated fluid(s) transmitted from heated fluid supply (ies) 140 to GT engine(s) 100 may be selected automatically via heating control program 212 and/or may be selected via a user of controller 120. In any case, controller 120 may produce control functions which directly affect thermal management and operation of GT engine(s) 100. In some cases, one or more intervening components (e.g., a converter (not shown)) may receive the control functions output from controller 120 to modify the operation of GT engine 100.

Figure 8:
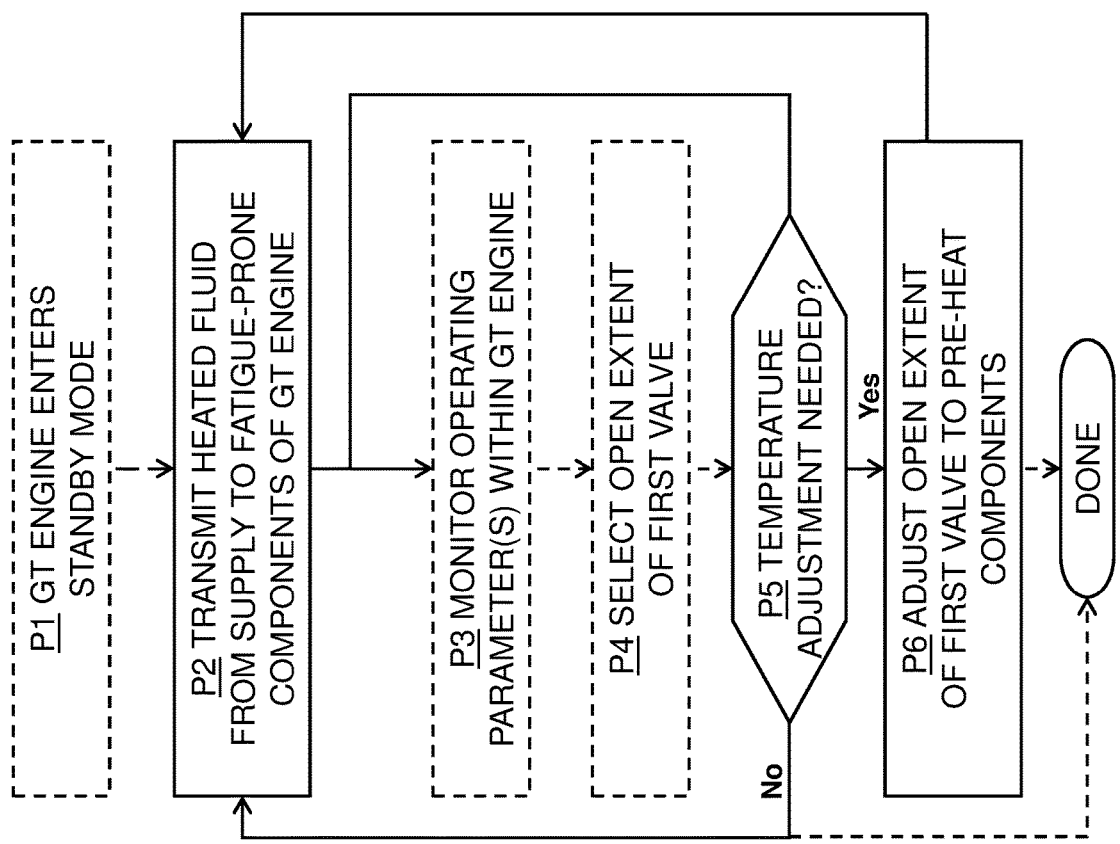
FIG. 8 shows a flow diagram of an example methodology of operating a power generation system, according to embodiments of the disclosure.

Referring to FIGS. 6 and 8, in which FIG. 8 provides an illustrative flow diagram of several operations, embodiments of the disclosure provide methods of operating a heated fluid delivery system 300 for supplying heated fluid to fatigue-prone components of GT engine(s) 100 in standby mode. Initially, methods of the disclosure may include process P1 of operating GT engine 100 in standby mode (e.g., a mode in which GT engine 100 operates but does not produce power via generator 130). Process P1 may include, e.g., initiating a transition of GT engine 100 from an operative state to a mode in which no power output is produced. In some cases, process P1 may occur independently of any methods according to the disclosure, and thus process P1 is indicated with dashed lines as being optional.

In process P2, methods of the disclosure may include transmitting heated fluid(s) from heated fluid supply 140 of heated fluid delivery system 300 to one or more fatigue-prone components of GT engine 100, including those within turbine assembly 110, in need of pre-heating to minimize extreme thermal gradients. In a more specific example, methods of the disclosure may include fluidly transmitting heated fluid(s) to wheel spaces WS of rotor 111 (FIG. 2) and/or other components that are in thermal or fluid communication with the HGP but partially physically isolated therefrom. Such components and/or regions may heat more slowly than other portions of the HGP and thus may have a stronger need for heated fluid(s), depending on the duration of time in which GT engine 100 has been in standby mode. Process P2 may be implemented without any initial determination of temperature within GT engine 100 from sensor(s) 121, e.g., due to the initially lower temperature(s) within GT engine(s) 100 when GT engine(s) 100 are present in a standby mode.

Methods of the disclosure optionally may include active monitoring of various HGP parameter(s) and selecting an open extent for valve(s) 142, VAs, VBs, V1, V2, V3, V4, V5, 150, 152, and/or 154 to provide a desired amount of warming. In process P3, controller 120 may measure operating parameter(s) within GT engine 100 via sensor(s) 121, e.g., with turbine assembly 110. The measured operating parameter(s) may include temperature as discussed herein, and/or related quantities such as temperature or fluid flow rate through GT engine 100. The measuring in process P3, regardless of relevant quantity, may cause data for monitored operating parameter(s) to be transmitted to controller 120 and stored therein as data 250 (e.g., within operating parameter field 252).

Optionally, further analysis may include determining an operating condition of GT engine 100. An "operating condition," as used herein, refers to any selected operational state of GT engine 100 including but not limited to: power output, type of mode currently underway, material composition of component(s) within GT engine 100, expected remaining life of component(s) within GT engine 100, etc. The operating condition(s), where determined, may affect a target operating temperature within the HGP. For instance, some operating conditions may increase or reduce the target temperature within the HGP to account for components with shorter remaining lifespans, a steady state operation with a power output that is less or greater than base load, etc.

The method also may include process P4 of selecting an open extent of valve(s) 142, VAs, VBs, V1, V2, V3, V4, V5, 150, 152, and/or 154 based on the monitored operating parameter(s). For instance, monitoring a relatively low temperature within the HGP in turbine assembly 110 may correlate with selecting a higher open extent (e.g., 50% or more) for valve(s) 142, VAs, VBs, V1, V2, V3, V4, V5, 150, 152, and/or 154, whereas monitoring a relatively high temperature within the HGP in turbine assembly 110 may correlate to selecting a lower open extent (e.g., less than 50%) for valve(s) 142, VAs, VBs, V1, V2, V3, V4, V5, 150, 152, and/or 154.

Regardless of whether processes P3, P4 are implemented, in process P5, controller 120 may determine whether any further temperature adjustment is needed within GT engine(s) 100. The determination may be based on, e.g., whether any operating parameter(s) (e.g., those measured in process P3) exceed any corresponding threshold(s) (including those stored in threshold field 256), and/or whether steady state operation has begun. In further example, the determination may be based on an amount of time that heated fluid(s) have been transmitted from heated fluid supply (ies) 140, an amount of time that turbine assembly 110 and/or GT engine 100 has been in standby mode, a rate of temperature change for certain heated component(s) within GT engine 100, etc. If no temperature adjustment is needed (i.e., "No" at process P5), the method may return to process P2 of transmitting heated fluid(s) from heated fluid supply (ies) 140 to GT engine 100. Alternatively, the method may simply conclude ("Done") as indicated by dashed lines in cases where no further temperature adjustment is needed for heated components within GT engine(s) 100.

If further temperature adjustment is needed (i.e., "Yes" at process P5), the method may instead continue to process P6 of adjusting a flow of heated fluid from heated fluid supply (ies) 140 into GT engine(s) 100 by adjusting one or more of valves 142, VAs, VBs, V1, V2, V3, V4, V5, 150, 152, and/or 154. The amount by which controller 120 adjust valve(s) 142, VAs, VBs, V1, V2, V3, V4, V5, 150, 152, and/or 154 may be predetermined, and/or may be calculated based on valve position field 254, e.g., open extent of each valve. The method then may return to process P2 for transmitting additional heated fluid(s) from heated fluid supply (ies) 140 to GT engine(s) 100, or otherwise may conclude ("Done") as indicated by dashed lines.

Referring to FIGS. 6 and 9, methods of the disclosure may be implemented with further variations to account for selective heating of fatigue-prone components within the HGP. Some implementations of GT system(s) 100 may include a heated fluid manifold 145 with multiple valves V1, V2, V3, V4, V5, each fluidly coupling different components or areas within GT engine(s) 100 to heated fluid supply 140. In this case, methods of the disclosure may include process P2.1 of selecting a specific portion of GT system(s) 100 in need of pre-heating. Process P2.1 may include, for example, selecting one or more wheel spaces, rotating blades, stationary blades, HGP regions, etc. to be heated based on past or current operating temperatures within such wheel spaces during a standby mode. In this case, the method also may include process P2.2 of transmitting heated fluid from heated fluid supply (ies) 140 to the fatigue-prone components within the selected portion(s) of GT engine(s) 100. The transmitting of heated fluids to only selected portions, components, etc., of GT system(s) 100 may be implemented by only opening certain valves V1, V2, V3, V4, V5 while closing others to control where heated fluid is directed. In all other respects, the method may be implemented substantially as discussed relative to other embodiments of the disclosure. That is, processes P1, P3, P4, P5, and P6 may be implemented as discussed elsewhere herein.

Technical effects of the embodiments described herein include changing the operating temperature of any desired components within GT engine(s) 100. In particular, methods of the disclosure cause GT engine(s) 100 to operate with shorter pre-heating periods and/or less drastic changes in temperature over short time spans. Embodiments of the disclosure thus enhance certain standby operating modes, particularly pre-heat operating modes of GT engine(s) 100, to improve the thermodynamic properties and related technical aspects of GT engine(s) 100 during operation.

Embodiments of the disclosure provide various technical and commercial advantages, examples of which are discussed herein. The disclosure may allow an operator of a power plant and/or an array of GT engines to use hot compressed air or other heated fluids from one GT engine to pre-heat another GT engine and vice versa. The use of a controller may allow hot compressed air to be delivered only to certain components in need of heating, thus making efficient use of available heat throughout an entire power plant and/or group of assemblies. Among other benefits, embodiments of the disclosure may extend the useful life of individual components within a GT engine by preventing such components from undergoing severe temperature swings as the GT engine(s) transition from one operating mode to another (e.g., from standby mode to a power-generating mode). A further benefit, which is realized in power plants having a 2×1 combined cycle configuration (i.e., two gas turbines coupled to a single steam turbine), is that the power plant operator has the option of shutting down a first GT engine while operating the second GT engine at a high load, instead of turning down both GT engines. As a result, fatigue damage from cycling both GT engines is avoided, and the required amount of power is produced at a higher efficiency.

The apparatus and devices of the present disclosure are not limited to any one particular turbomachine, engine, turbine, jet engine, power generation system or other system, and may be used with other turbomachines such as aircraft systems, power generation systems and/or related systems (e.g., combined cycle, simple cycle, nuclear reactor, etc.). Additionally, the apparatus of the present disclosure may be used with other systems not described herein that may benefit from the increased efficiency of the apparatus and devices described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure such that various modifications as are suited to the particular use may be contemplated.

What is claimed is:

1. A system for pre-heating a gas turbine (GT) engine of a power generation system in a standby mode, the system comprising:
    a first heated fluid manifold coupled to the GT engine;
    a first conduit coupling a heated fluid supply external to the GT engine to the first heated fluid manifold;
    a first plurality of valves configured to control an amount of heated fluid flow through the first conduit between the heated fluid supply and one or more fatigue-prone components of the GT engine; and
    a controller in communication with the first plurality of valves, wherein the controller;
        selects a position of at least one of the first plurality of valves based on a temperature of the one or more fatigue-prone components, and
        adjusts an open extent of at least one of the first plurality of valves to the position to control the temperature of the one or more fatigue-prone components based on an operating condition of the GT engine.

2. The system of claim 1, wherein the one or more fatigue-prone components is located within a compressor, a combustor, or a turbine of the GT engine.

3. The system of claim 1, further comprising a first sensor coupled to the controller, wherein the first sensor is within a compressor or a combustor of the GT engine to measure the temperature of the one or more fatigue-prone components.

4. The system of claim 3, further comprising a second sensor coupled to the controller, wherein the second sensor is within a wheel space of the compressor or a turbine of the GT engine to determine a temperature of an additional fatigue-prone component.

5. The system of claim 1, further comprising:
    a second plurality of valves coupling the first heated fluid manifold to the one or more fatigue-prone components within the GT engine;
    wherein the controller selectively adjusts an open extent of each valve of the second plurality of valves to control a temperature of the one or more fatigue-prone components.

6. The system of claim 1, wherein the first plurality of valves includes:
an isolation valve configured to impede fluid flow in a selected direction through the first conduit; and
a flow control valve coupled to the isolation valve and configured to control the amount of fluid flow through the first conduit in the selected direction;
wherein the isolation valve and the flow control valve are positioned within a valve skid.

7. The system of claim 1, wherein the standby mode comprises a pre-heat operating mode of the GT engine.

8. The system of claim 1, wherein the heated fluid supply is within a compressor of an additional GT engine operatively coupled to the GT engine, the additional GT engine being in a non-standby mode.

9. A system for pre-heating a gas turbine (GT) engine of a power generation system, the system comprising:
a first gas turbine (GT) engine in a standby mode and having one or more fatigue-prone components;
a first heated fluid manifold coupled to the first GT engine;
a second GT engine operating in a non-standby mode and having a compressor, wherein a portion of the compressor of the second GT engine provides a heated fluid supply;
a second heated fluid manifold coupled to the second GT engine;
a first conduit coupling the heated fluid supply to the first heated fluid manifold, such that the one or more fatigue-prone components are in thermal connection with a heated fluid from the first heated fluid manifold;
a first plurality of valves configured to control an amount of a heated fluid flow through the first conduit between the heated fluid supply and the one or more fatigue-prone components; and
a controller in communication with the first plurality of valves, wherein the controller adjusts an open extent of at least one of the first plurality of valves to control a temperature of the one or more fatigue-prone components.

10. The system of claim 9, wherein the one or more fatigue-prone components are within a compressor, a combustor, or a turbine of the first GT engine.

11. The system of claim 9, further comprising a sensor coupled to the controller, wherein the controller determines the open extent of at least one of the first plurality of valves based on a temperature within the first GT engine monitored via the sensor.

12. The system of claim 11, wherein the sensor is within a wheel space of a compressor or a turbine of the first GT engine.

13. The system of claim 9, further comprising:
a second plurality of valves coupling the heated fluid supply to the one or more fatigue-prone components of the first GT engine;
wherein the controller selectively adjusts an open extent of each valve of the second plurality of valves based on a temperature of the one or more fatigue-prone components to control a temperature of the one or more fatigue-prone components.

14. The system of claim 9, wherein the first plurality of valves includes:
a first isolation valve configured to impede the heated fluid flow in a selected first direction; and
a first flow control valve coupled to the first isolation valve configured to control the amount of heated fluid flow through the first conduit in the selected first direction;
wherein the first isolation valve and the first flow control valve are positioned within a valve skid disposed between the first GT engine and the second GT engine.

15. The system of claim 14, wherein the valve skid comprises a second conduit coupled to the second heated fluid manifold; a second isolation valve configured to impede the heated fluid flow in a selected second direction opposite from the selected first direction; and a second flow control valve coupled to the second isolation valve configured to control the amount of heated fluid flow through the second conduit in the selected second direction.

16. A method for pre-heating a portion of a gas turbine (GT) engine of a power generation system in a standby mode, the method comprising:
transmitting a heated fluid from a heated fluid supply external to the GT engine through a first conduit to one or more fatigue-prone components within the portion of the GT engine; and
adjusting an open extent at least one of a first plurality of valves configured to control a flow of the heated fluid through the first conduit between the heated fluid supply and the one or more fatigue-prone components based on a temperature of the one or more fatigue-prone components,
wherein the heated fluid supply is provided by a compressor of an additional GT engine operatively coupled to the GT engine in standby mode, the additional GT engine being in a non-standby mode.

17. The method of claim 16, further comprising:
monitoring the temperature of the one or more fatigue-prone components via a sensor within the GT engine; and
selecting the open extent of at least one of the first valves based on the temperature of the one or more fatigue-prone components, wherein the adjusting is further based on an operating condition of the GT engine.

18. The method of claim 17, further comprising monitoring a wheel space temperature.

19. The method of claim 16, further comprising:
transmitting the heated fluid from the heated fluid supply through a first heated fluid manifold to the one or more fatigue-prone components, the first heated fluid manifold comprising a second plurality of valves; and
adjusting an open extent of at least one of the second plurality of valves to control a flow of the heated fluid through the first heated fluid manifold based on the temperature of the one or more fatigue-prone components.

20. The method of claim 16, wherein the standby mode includes a pre-heat operating mode of the GT engine.

* * * * *

UNITED STATES PATENT AND TRADEMARK OFFICE
CERTIFICATE OF CORRECTION

| | | |
|---|---|---|
| PATENT NO. | : 12,291,999 B1 | Page 1 of 1 |
| APPLICATION NO. | : 18/499692 | |
| DATED | : May 6, 2025 | |
| INVENTOR(S) | : Carlos Miguel Miranda | |

It is certified that error appears in the above-identified patent and that said Letters Patent is hereby corrected as shown below:

In the Claims

In Column 20, Claim 1, Line 38, delete "controller;" and insert -- controller: --, therefor.

Signed and Sealed this
Twenty-fourth Day of June, 2025

Coke Morgan Stewart
*Acting Director of the United States Patent and Trademark Office*